W. G. HALBURT.
Cultivators.

No. 134,662. Patented Jan. 7, 1873.

Inventor:
Wm. G. Halburt
by A. H. & K. K. Evans
his Attys.

UNITED STATES PATENT OFFICE.

WILLIAM G. HALBURT, OF COLUMBUS, MISSISSIPPI.

IMPROVEMENT IN CULTIVATORS.

Specification forming part of Letters Patent No. 134,662, dated January 7, 1873.

*To all whom it may concern:*

Be it known that I, WILLIAM G. HALBURT, of Columbus, in the State of Mississippi, have invented a new and useful Improvement in Cultivators, of which the following is a full, clear, and exact description, reference being had to the accompanying drawing, in which—

Figure 1:
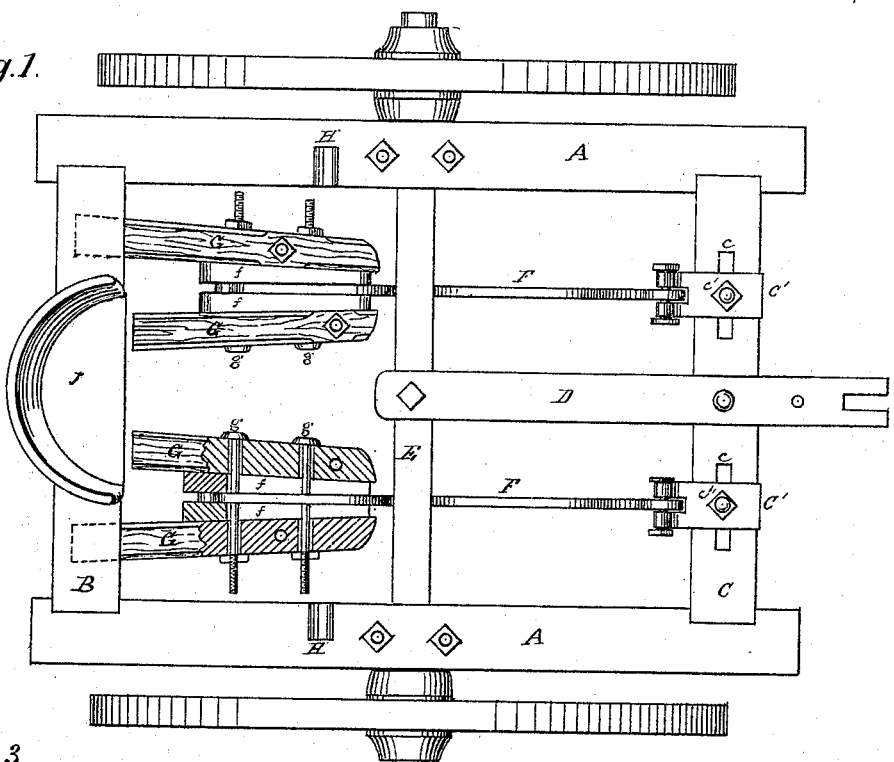
Figure 3:
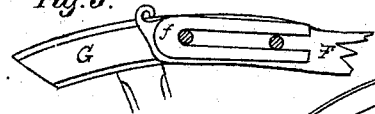
Figure 4:
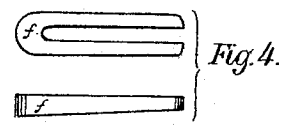
Figure 2:
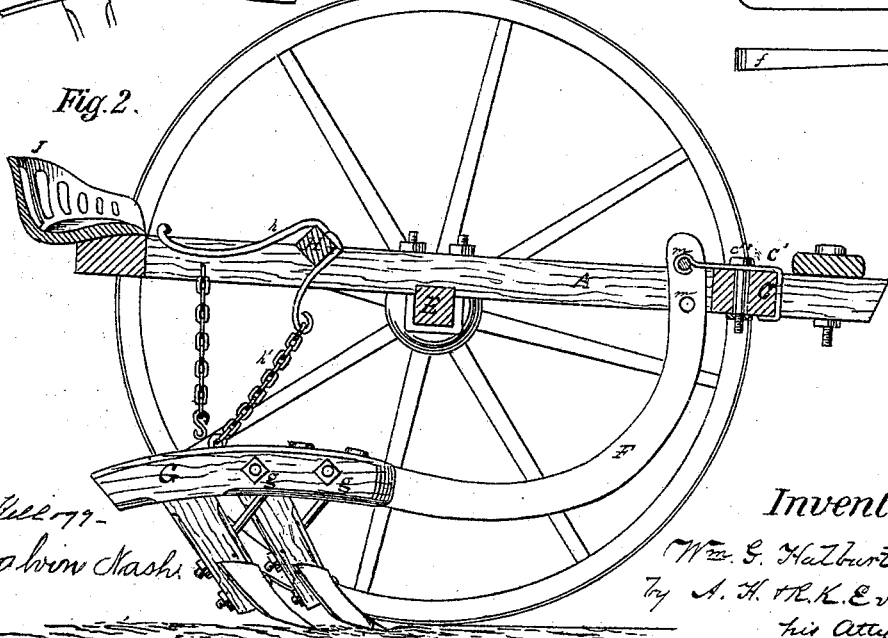

Figure 1 is a plan view of a cultivator with my improvements attached; Fig. 2 is longitudinal vertical section of same; and Figs. 3 and 4 are detached views of the adjusting-wedge $f$.

My improvement relates to that class of cultivators wich is attached to a frame on wheels; and consists in the mode of adjustment so as to adapt the cultivators to any desired width of furrows. By my improvement I secure not only an adjustment of the cultivators, but also an adjustment of the plates of each cultivator.

In order to enable others skilled in the art to make and use my invention, I will proceed to describe the exact manner in which I have carried it out.

The frame A B C is made and mounted on wheels in the usual manner of such cultivators. The cross-beam C is slotted, as shown at $c\ c$, and in these slots works the sliding clevis C′, secured by the bolt $c''$. To each clevis is attached the curved tongue F, as shown in Fig. 2, carrying the cultivator G. The curved tongue F is provided with two or more holes, $m\ m$, by means of which the dip of the cultivators is regulated and controlled. The distance between the cultivators, or their position in relation to the frame A B C, is readily adjusted by means of the sliding clevis C′ sliding in the slot $c$, as shown in Fig. 1. The distance between the plates of the same cultivator is easily adjusted by means of the peculiar-shaped wedge $f$. (See Figs. 1, 3, and 4.) The screws $g$ pass through the stocks G, and secure between each pair of stocks the lower end of one of the curved tongues F. Between the tongue and the stock, on either side, is introduced the wedge $f$, as shown in Fig. 1, and by this simple means the adjustment of my cultivator is complete, the screws $g\ g$ being sufficiently long to admit of any desired adjustment.

The cultivators are raised or lowered by the means of bar H, the lever $h$, and the chain $h'$, the usual means used in this class of cultivators.

Having thus described my invention, what I claim as new, and desire to secure by Letters Patent, is—

1. In combination with the frame A B C, the sliding clevis C′ moving in the slots $c$, and the curved tongue F, all constructed and arranged substantially as and for the purpose set forth.

2. The wedges $f\ f$, in combination with the cultivator-stocks G G and screw-bolts $g\ g$, substantially as and for the purpose set forth.

WILLIAM G. HALBURT.

Witnesses:
J. M. DEARING,
I. H. RICHARDS.